H. HASTINGS.
SAWING MACHINE.
APPLICATION FILED JAN. 9, 1909.
976,075.
Patented Nov. 15, 1910.
2 SHEETS—SHEET 1.
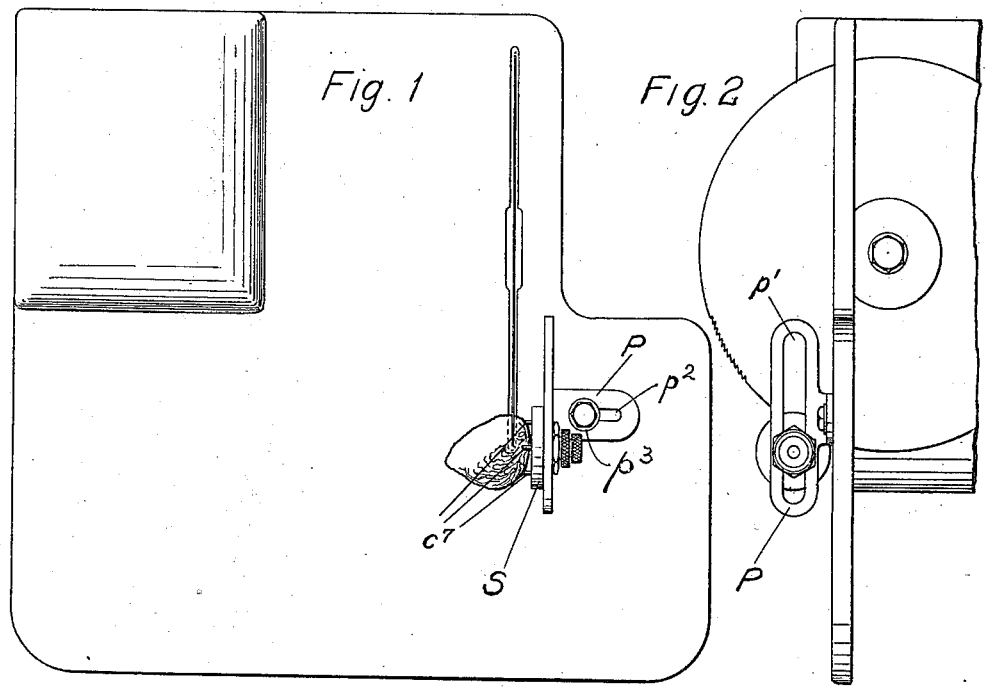
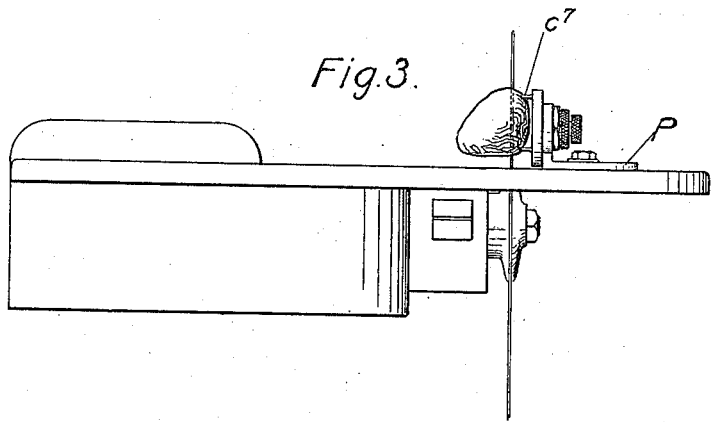
WITNESSES:
Leonard J. Hall
L. A. Angle
INVENTOR
Herbert Hastings H. HASTINGS.
SAWING MACHINE.
APPLICATION FILED JAN. 9, 1909.
976,075.
Patented Nov. 15, 1910.
2 SHEETS—SHEET 2.
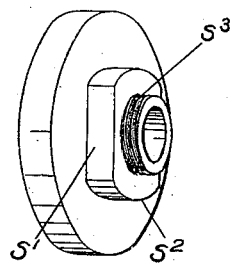
Fig. 7.
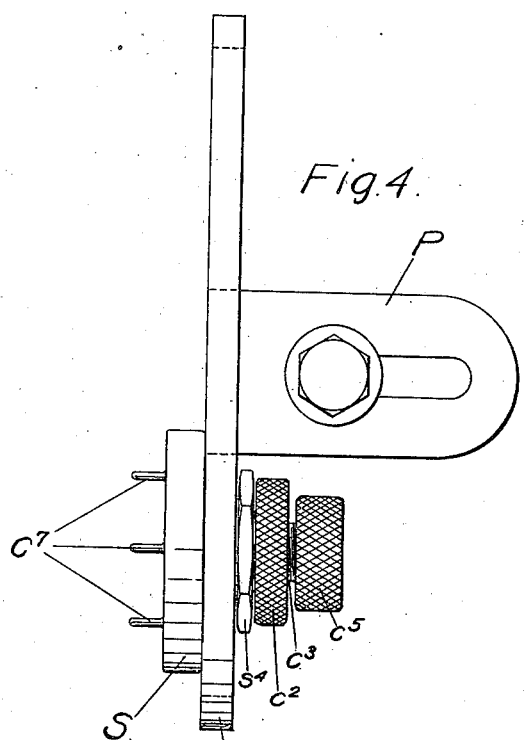
Fig. 4.
Fig. 6.
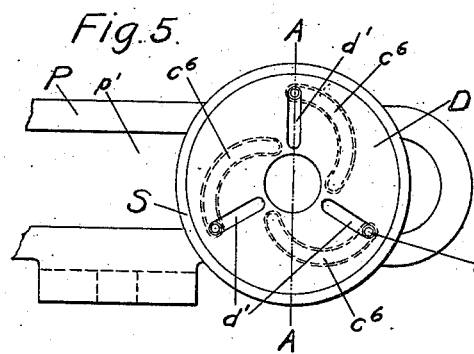
Fig. 5.
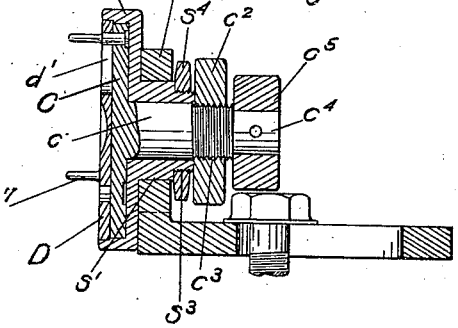
WITNESSES:
Leonard J. Hall
L. A. Angle
INVENTOR
Herbert Hastings

UNITED STATES PATENT OFFICE.

HERBERT HASTINGS, OF ROCHESTER, NEW YORK.

SAWING-MACHINE.

976,075.   Specification of Letters Patent.   Patented Nov. 15, 1910.

Application filed January 9, 1909. Serial No. 471,524.

*To all whom it may concern:*

Be it known that I, HERBERT HASTINGS, a citizen of the United States, residing in Rochester, in the county of Monroe and State of New York, have invented certain Improvements in Machines for Sawing Articles such as Ivory Nuts, of which the following description, in connection with the accompanying drawings, is a specification, like reference characters on the drawings indicating like parts on the several figures.

This invention relates particularly to circular saws used in cutting vegetable ivory nuts into slabs preparatory to the manufacture of buttons therefrom. In the methods commonly employed the nut is either held between the operator's fingers while being sawed, the thickness of the piece being sawed off, depending on his judgment; or the nut is held against a flat gage sensibly parallel with the saw and at a fixed distance from it which determines the thickness of the piece as measured from a single point at or near the center of its area, resting against it; or the nut is held against a gage consisting of two edges which are parallel to each other and to the saw and at a fixed distance from it which determines the thickness of the piece as measured from two points at a fixed distance from the center of its area, resting against it. The value of the pieces thus cut from the nuts is proportional to the diameter of the button or disk and its thickness at the circumference that may be turned from them, therefore it is desirable to gage the thickness of the piece being sawed from more than two points and approximately near the circumference of the disk to be formed therefrom.

My invention as hereinafter described provides means by which this last desideratum is accomplished and since three points are necessary and sufficient for determining a plane I preferably show but three gage points.

Other advantages of my invention are facility in feeding the nut through the saw and less danger of the operator's fingers coming in contact with the saw.

In the preferred form of my invention herein shown Figure 1 represents a plan view of an ivory nut sawing table embodying my invention and showing the outline of a nut as held against the gage points in the process of sawing. Fig. 2 is a right hand side elevation of Fig. 1. Fig. 3 is a front elevation of Fig. 1. Fig. 4 is a plan view showing the essential features of my invention. Fig. 5 is a left hand elevation thereof. Fig. 6 is a front sectional elevation on line A A of Fig. 5. Fig. 7 is a perspective view of the gage slide.

In the drawings S is the gage slide which is adapted to slide in slot $P^1$ of the slide plate P and is kept from turning therein by flat portions $s^1$ on the stem $s^2$ thereof. The stem $s^2$ has an extended portion $s^3$ threaded to receive the nut $s^4$ which screws tight against the shoulder of $s^2$ leaving S free to slide back and forth in slot $p^1$ of plate P, but restrains it from motion parallel to its axis. The gage slide S has a hole passing through it and an enlarged recess which receives the cam plate C the hub $c^1$ of which extends beyond $s^3$ and is threaded at $c^3$ to receive a nut $c^2$ which binds C in any predetermined position within S. The hub $c^1$ is further extended and carries on its reduced end $c^4$ the knob $c^5$ which is rigidly held thereto, so that by it the cam plate C may be rotated when the nut $c^3$ is loosened. In the cam plate C are three spiral cam slots $c^6$ which receive the three equally spaced gage pins $c^7$ against which the nut rests and which determine the thickness of the piece resting against them while being sawed off. The extreme left hand end of the gage slide S is recessed sensibly larger than for the cam plate C and in this recess is rigidly held the gage pin disk D which has three equally spaced radial slots $d^1$ in which the gage pins $c^7$ are constrained to slide by the cam slots $c^6$ when cam C is rotated thus adjusting the gage points away from or toward the center as desired. In the slide plate P is a second slot $p^2$ through which the binding screw $p^3$, which threads into the saw table, passes and operates to hold the slide plate and thereby the gage slide in any position, within its range, relative to and parallel to the plane of the saw.

From the foregoing description of my invention it will be understood that the operator facing the saw table, as at the lower side of Fig. 1, holds a nut about to be sawed, in the left hand and by pressing it against the gage pins $c^7$ these pins determine the diameter of the portion on the right hand side of the saw, in a plane parallel with and in proximity to the saw, and the sawing is accomplished by sliding the gage slide with the right hand thus carrying the nut back into engagement with the saw while the left hand continues to steady the portion of the nut on the left of the saw.

Having described my invention, what I claim as new, and desire to secure by Letters Patent is—

1. In a machine of the class described, the combination with a saw, a saw table and a gage thereon comprising a plurality of pointed gaging devices projecting toward the plane of the saw and arranged to engage the side face of the work.

2. In a machine of the class described, the combination with a saw, a saw table, and a gage comprising a plurality of pointed gaging devices projecting toward the plane of the saw, and arranged to engage the side face of the work the points of said devices being in a plane sensibly parallel to the sawing plane.

3. In a machine of the class described, the combination with a saw, a saw table, a gage comprising a plurality of pointed gaging devices projecting toward the plane of the saw, and arranged to engage the side face of the work and means of varying their distance from the saw.

4. In a machine of the class described, the combination with a saw, a saw table, a gage comprising a plurality of pointed gaging devices projecting toward the plane of the saw, and arranged to engage the side face of the work and means of adjusting these devices relative to each other.

5. In a machine of the class described, the combination with a saw, a saw table, a gage comprising a plurality of pointed gaging devices projecting toward the plane of the saw, and arranged to engage the side face of the work and means of adjusting them relative to each other and in a plane parallel to the saw.

6. In a machine of the class described, the combination with a saw, a saw table, a gage comprising a plurality of pointed gaging devices projecting toward the plane of the saw, and arranged to engage the side face of the work and means of adjusting them relative to each other so that all the points lie sensibly on a circle, the plane of which is parallel to the saw.

7. In a machine of the class described, the combination with a saw, a saw table, a gage comprising a plurality of pointed gaging devices projecting toward the plane of the saw, and arranged to engage the side face of the work means of adjusting them relative to each other, and means of adjusting them relative to the plane of the saw.

8. In a machine of the class described, the combination with a saw, a saw table, a gage comprising a plurality of pointed gaging devices projecting toward the plane of the saw, and arranged to engage the side face of the work and means of adjusting them relative to each other, means of retaining them in positions on the circumference of a predetermined circle the plane of which is parallel to the plane of the saw, and means of varying the distance from the saw.

In testimony whereof I have signed my name to this specification in the presence of two subscribing witnesses.

HERBERT HASTINGS.

Witnesses:
MILTON NOYES,
LEONARD I. HALL.